United States Patent
Foch et al.

(10) Patent No.: US 7,939,962 B2
(45) Date of Patent: May 10, 2011

(54) SYSTEM AND METHOD FOR SUPPLYING POWER TO USER SYSTEMS ONBOARD AN AIRCRAFT

(75) Inventors: Etienne Foch, Toulouse (FR); Gaetan Bisson, Toulouse (FR); Pascal Maussion, Toulouse (FR); Maria Pietrzak-David, Montastruc la Conseillere (FR); Maurice Fadel, Toulouse (FR)

(73) Assignees: Airbus France, Toulouse (FR); Centre National de la Recherche Scientifique, Paris (FR)

( * ) Notice: Subject to any disclaimer, the term of this patent is extended or adjusted under 35 U.S.C. 154(b) by 173 days.

(21) Appl. No.: 11/689,821

(22) Filed: Mar. 22, 2007

(65) Prior Publication Data
US 2007/0262644 A1 Nov. 15, 2007

(30) Foreign Application Priority Data
Mar. 24, 2006 (FR) .................................. 06 02566

(51) Int. Cl.
*B60L 1/00* (2006.01)
*H02J 3/06* (2006.01)
(52) U.S. Cl. .......................................... 307/9.1; 307/19
(58) Field of Classification Search ................. 307/9.1, 307/18, 19
See application file for complete search history.

(56) References Cited

U.S. PATENT DOCUMENTS

| 4,355,239 | A |   | 10/1982 | Williams et al. |
|---|---|---|---|---|
| 5,874,786 | A | * | 2/1999 | McVey et al. ................... 307/18 |
| 6,018,233 | A | * | 1/2000 | Glennon ........................ 322/22 |
| 6,037,752 | A | * | 3/2000 | Glennon ........................ 322/22 |
| 7,098,555 | B2 | * | 8/2006 | Glahn et al. .................... 307/32 |
| 7,173,347 | B2 | * | 2/2007 | Tani et al. .................... 307/10.1 |
| 7,439,634 | B2 | * | 10/2008 | Michalko ........................ 307/43 |
| 2006/0044722 | A1 |   | 3/2006 | Wavering et al. |
| 2006/0174629 | A1 | * | 8/2006 | Michalko ....................... 60/774 |
| 2008/0058998 | A1 | * | 3/2008 | Breit ............................ 700/295 |

FOREIGN PATENT DOCUMENTS
WO   WO 2004/037641 A2   5/2004
* cited by examiner

*Primary Examiner* — Michael Rutland Wallis
(74) *Attorney, Agent, or Firm* — Oblon, Spivak, McClelland, Maier & Neustadt, L.L.P.

(57) ABSTRACT

The invention relates to a power supply system for several user systems onboard an aircraft. This system comprises at least two power supply electronics (10, 11) and means of connecting these at least two power supply electronics to at least two user systems (12, 13, 14, 15), characterised in that these connecting means comprise a network of connecting contactors (16, 17; 32, 33) from each power supply electronics with at least two user systems not performing similar functions but technologically compatible such that these power supply electronics supply these user systems at different times.

5 Claims, 2 Drawing Sheets

SYSTEM AND METHOD FOR SUPPLYING POWER TO USER SYSTEMS ONBOARD AN AIRCRAFT

TECHNICAL DOMAIN

This invention relates to a system and method for supplying power to user systems or loads onboard an aircraft.

In the following description, we will consider an airplane type aircraft as an example, to simplify the description.

STATE OF PRIOR ART

Classically, three sources of secondary energy are used in an airplane: firstly, hydraulic energy used essentially for power actuators, secondly, pneumatic energy used for pressurization and treatment of air, and electrical energy used for avionics and lighting.

But the current trend is that airplanes will become <<more-electric>>. It is even envisaged that they might become <<all-electric>>, in which case electrical energy would become the principal source of energy.

The systems used in a <<more-electric>> airplane are similar to the systems used in previous aircraft but the proportion of electrical equipment becomes higher, which is why there is an advantage in reducing the power electronics part.

Therefore, the purpose of the invention is to improve existent systems by mutualising power electronics on airplane systems, in other words using power electronics common to several user systems in order to reduce the number of onboard electronics and to propose optimised architectures.

However, it is important to note that in aeronautics, no single failure or event must cause the loss of a function, so that service continuity can be maintained. Therefore all systems are doubled up or tripled, and at any one moment one of these systems will be active while the other system(s) is (are) passive. Similarly, all inter system power or control connections must be separate. Therefore, there is a need for electrical and physical separation, at least at the sources and power supply lines, obtained by the definition of different <<routes>> by making several electrical harnesses travel along different parts of the airplane.

It is found that in an aircraft, a large number of power electronics are only used during short periods, and that they remain inactive in the remainder of the time. For example, this is the case for thrust reversers that are only used for a few seconds in a flight during the braking phase during landing. This is also the case for landing gear that is only used for a few tens of seconds. Furthermore, such uses are discontinuous, therefore their use may or may not be simultaneous. For example, cargo doors are only used on the ground and when parked, unlike most systems that are used during the landing and/or running or cruise phases. Thrust reversers, airbrakes and wheelbrakes are used during braking, and remain inactive for the remainder of the time.

On the other hand, power electronics are used continuously. This is the case for example for the air conditioning system that pressurizes air in the aircraft or the ailerons. However, it would be feasible to disconnect an air conditioning compressor to control other systems, for example the slats or the flaps that are only used during very short periods, the inertia of the air conditioning system being large compared with the duration of use of the slats or the flaps. Furthermore, air compressors are used at full power especially during the climb and cruise phases, while many other systems are used during the take off and approach phases (landing gear, slats and flaps) and/or the landing phase (braking, spoilers, thrust reversers, etc.).

Thus, the purpose of the invention is to solve the problem of improving existing systems by proposing a power supply system that includes at least one power electronics common to several user systems.

PRESENTATION OF THE INVENTION

The invention relates to a power supply system for several user systems onboard an aircraft, for example an airplane, comprising at least two power supply electronics and means of connecting these at least two power supply electronics and at least two user systems, characterised in that these connecting means comprise a network of connecting contactors from each power supply electronics with at least two user systems not performing similar functions but technologically compatible such that these power supply electronics supply these user systems at different time.

Advantageously, the user systems are among the following systems:
  air conditioning,
  flaps,
  slats,
  thrust reversers,
  landing gear,
  engine start-up,
  doors,
  spoilers,
  airbrakes,
  brakes.

In a first advantageous embodiment, the system according to the invention comprises an architecture with four 100 kW power electronics.

In a second embodiment, each 100 kW power electronics is divided into two 50 kW power electronics. The air conditioning motors can then be powered by at least one 50 kW power electronics.

The system according to the invention can reduce the number and/or size of power switches for a set of user systems.

The invention also relates to a power supply method for user systems onboard an aircraft, implementing a system comprising at least two power supply electronics and means of creating a connection between at least one power supply electronics and at least two user systems, characterised in that each power supply electronics is connected to at least two user systems that do not perform a similar function and that are technologically compatible, such that this power supply electronics supplies power to these systems at different times.

In this method, for each power electronics:
  it is used for different purposes alternately, or usage durations are dissociated in time,
  the work cycle, powers and functions of all user systems are studied in order to determine which user systems can be put into connection with the power supply electronics,
  a table is filled that gives work cycles corresponding to each user systems as a function of the different flight phases of the aircraft.

The invention also relates to an aircraft comprising a system like that defined above, and an aircraft comprising a system that could use the method as defined above.

DETAILED PRESENTATION OF PARTICULAR EMBODIMENT

The system according to the invention comprises at least one power electronics common to several user systems, that is capable of supplying power to several systems at different instants through a network of contactors that reconfigure electronic power/user system connections. Each power electronics can supply power to one or several systems, but only one at a time.

In this network of contactors, the contactors may equally well be electromechanical contactors or static contactors, static contactors enabling faster communications than electromagnetic contactors.

Unlike a standard system, the system according to the invention enables redundancy without any unused power electronics (in <<stand-by>>).

Figure 1:
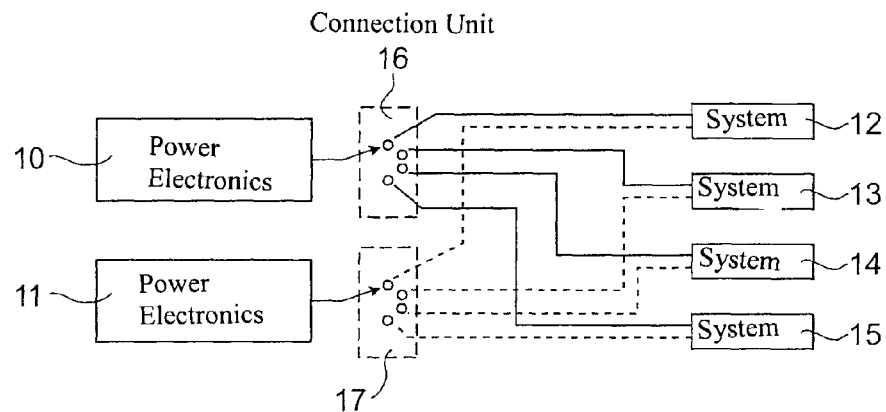
FIG. 1 diagrammatically illustrates the system according to the invention.
Figure 2:
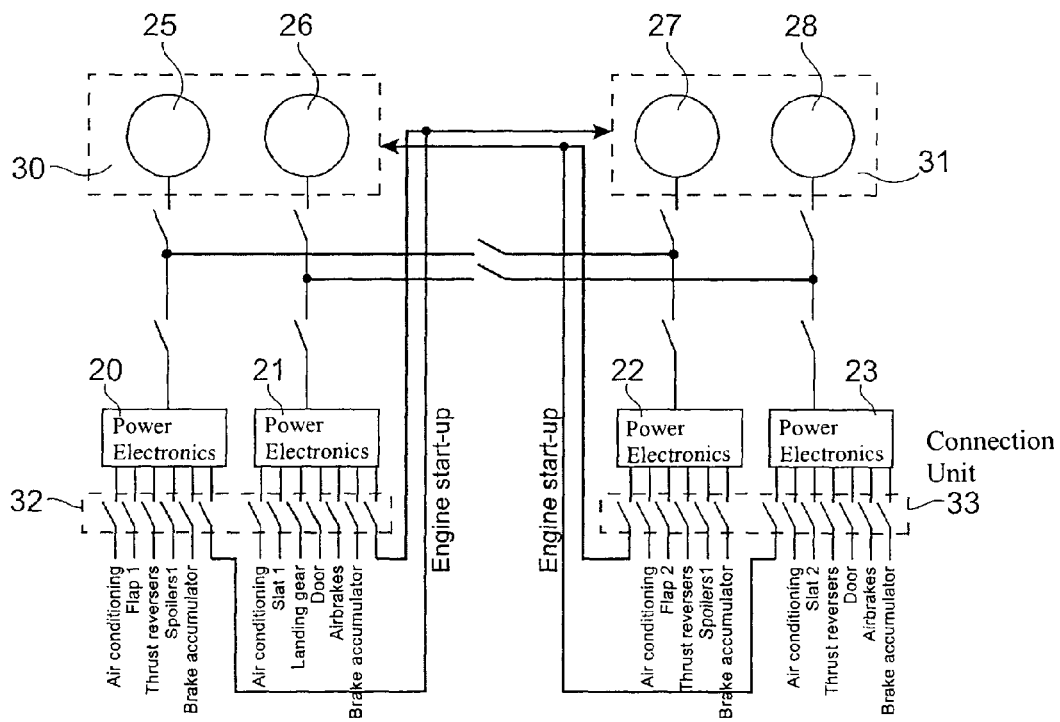
FIG. 2 illustrates a first example embodiment of this system according to the invention.

In the example with four user systems illustrated on FIG. 1, two power electronics 10 and 11 can be used to supply power to four systems 12, 13, 14 and 15 through contactors 16 and 17. Therefore only two systems can be active simultaneously. There will always be one active system if there is a failure in one power electronics 10 or 11, the four systems 12, 13, 14 and 15 being available one after the other. Therefore, there are no <<hidden>> failures due to unused systems.

The different user systems to be supplied by common power electronics must satisfy the following criteria:
- possibility of alternate use or dissociation of usage durations in time.
- mutualisation of systems that do not perform similar functions, the loss of power electronics possibly affecting several user systems,
- technological compatibility of user systems that must be powered by the same power electronics,
- consideration of the physical location of systems in the airplane so that cables are not too long.

For example, after studying their working cycles, power and functions, it would appear that the following group of systems could be mutualised in this manner:
air conditioning,
flaps,
slats,
thrust reversers,
landing gear,
engine start-up,
doors,
spoilers,
airbrakes,
brakes.

The table given at the end of the description contains work cycles corresponding to each of these systems as a function of the different flight phases.

First Example Embodiment

This first example takes account of the large number of user systems and the complexity of association with users systems with similar functions (braking/thrust reversers, slats/flaps, etc.).

This example presents an architecture with four 100 kW power electronics 20, 21, 22 and 23 sized for the user system with the highest power (air conditioning) and to supply power to the other systems through a network reconfiguration, made through the network contactors 32 and 33, with a two-jet type airplane comprising two generators 25, 26 and 27, 28 per motor 30 and 31.

The four power electronics 20, 21, 22 and 23 supply power to the different user systems associated with them one after the other, namely respectively:
for the electronics 20:
   air conditioning,
   flap 1,
   thrust reverser,
   spoilers 1,
   brake accumulators,
   engine start-up 31,
for the electronics 21:
   air conditioning,
   slat 1,
   landing gear,
   door,
   airbrakes,
   brake accumulators,
   engine start-up 31,
for electronics 22:
   air conditioning,
   flap 2,
   thrust reverser,
   spoilers 1,
   brake accumulators,
   engine start-up 30,
for electronics 23:
   engine start-up 30,
   air conditioning,
   slat 2,
   thrust reverser,
   door,
   airbrakes,
   brake accumulators.

System associations are made taking account of redundancy criteria (no mutualisation of two redundant systems). Thus, systems with similar functions, for example such as slats and flaps, are not mutualised.

Mutualisation of these different systems means that only power electronics that are necessary simultaneously have to be installed onboard, thus avoiding several tens of kW of power electronics that only operate for 20 or 30 seconds during the total duration of a flight.

Second Example Embodiment

Figure 3:
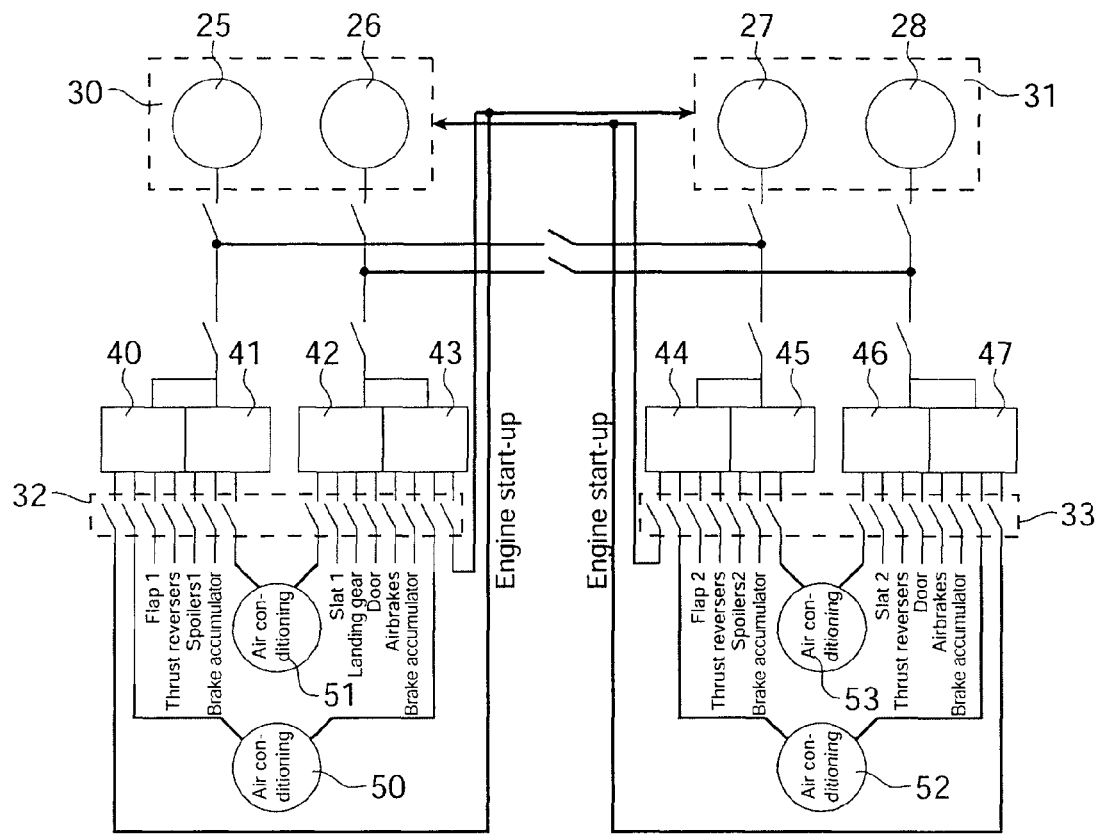
FIG. 3 illustrates a second example embodiment of the system according to the invention.

This second example embodiment illustrated on FIG. 3 is a variation of the previous structure in which each power electronics is divided into two 50 kW power electronics (electronics 40 to 47).

Thus, these power electronics are connected to the following user systems:
for the electronics 40:
   engine start-up 31,
   air conditioning 50,
   flap 1,
   thrust reverser,
for the electronics 41:
   spoilers 1,
   brake accumulators,
   air conditioning 51, for the electronics 42:
  air conditioning 51,
  slat 1,
  landing gear,
  door,
for the electronics 43:
  airbrakes,
  brake accumulators,
  air conditioning 50,
  engine start-up 31,
for the electronics 44:
  engine start-up 30,
  air conditioning 52,
  flap 2,
  thrust reverser,
for the electronics 45:
  spoilers 2,
  brake accumulators,
  air conditioning 53,
for the electronics 46:
  air conditioning 53,
  slat 2,
  thrust reverser,
  door,
for the electronics 47:
  airbrakes,
  brake accumulators,
  air conditioning,
  engine start-up 30.

This second example enables mutualisation in which more systems are available simultaneously.

The highest power in an airplane is for air conditioning, which imposes the use of 100 kW power electronics, and the next immediately lower power does not exceed 50 kW.

Air conditioning systems 50, 51, 52 and 53 can be powered by two 50 kW power electronics in parallel, or in a double-star type connection.

Thus, air conditioning systems can be used either at 50% of their power (50 kW), or at 100% of their power (100 kW), or they can be disconnected:

At 50% of their Power:

An air conditioning system, for example 50, is powered by a single 50 kW electronics 40 or 43 that outputs half of the power, the other 50 kW electronics remaining available to power another user system.

At 100% Power:

The air conditioning system, for example 50, is powered by two 50 kW electronics 40 and 43 to supply the nominal power of the motor.

Disconnected Mode:

The two 50 kW electronics, for example 40 and 43, are used to activate two user systems other than the air conditioning system simultaneously, at a time when the air conditioning system does not require any power.

This second example embodiment has the advantage that it enables a larger number of users systems other than the air conditioning system to be used simultaneously, which improves their availability. Air conditioning is only used slightly during the approach and take off phases, but these are the times at which the need for intermittent systems is greatest.

This second example enables energy management. For example, if only 50% of the air conditioning is necessary, the remaining power can be absorbed by another user system which can then accept load from a power bus bar or a generator.

TABLE

| Load | Ground | Start | Taxi | Take off | Climb | Cruise | Descent | Landing | Taxi |
|---|---|---|---|---|---|---|---|---|---|
| I/B aileron | | X | X | X | X | X | X | X | X |
| O/B aileron | | X | X | X | X | X | X | X | X |
| Rudder | | X | X | X | X | X | X | X | |
| Elevator | | X | X | X | X | X | X | X | |
| THS (Trimmable Horizontal Stabiliser) | | X | X | X | X | X | X | X | |
| Spoilers | | X | X | X | X | X | X | X | |
| Airbrakes | | | | | | | X | X | |
| O/B Flaps | Extended | | Retracted | Retracted | Retracted | | Extended | Extended | Extended |
| I/B Flaps | Extended | | Retracted | Retracted | Retracted | | Extended | Extended | Extended |
| Slats | Extended | | Retracted | Retracted | Retracted | | Extended | Extended | Extended |
| Main LG (main landing gear) | | | | Retracted | | | Extended | | |
| Nose LG (nose landing gear) | | | | Retracted | | | Extended | | |
| Braking | | | X | | X | | X | X | X |
| Thrust reversers | | | | | | | | X | |
| Cowl opening system | X | | | | | | | | |
| De-icing | | X | X | X | X | X | X | X | |
| Air conditioning | X | X | X | X | X | X | X | X | X |
| Motor start-up | X | X | X | X | X | X | X | X | X |
| Doors | X | | | | | | | | |

The invention claimed is:

1. A power supply system for multiple aircraft systems of an aircraft, the power supply system comprising:
   a plurality of electric power supply units;
   a plurality of aircraft system units that include air conditioning, flaps, slats, thrust reversers, landing gear, engine start-up, doors, spoilers, and brakes; and
   a network of contactors configured to establish electrical connections between the plurality of aircraft system units and the plurality of electric power supply units,
   wherein the plurality of electric power supply units include,
      a first electric power supply unit configured to supply power to the air conditioning, a first flap, the thrust reverser, a first spoiler, a brake accumulator, and the engine start-up, but only one at a time,
      a second electric power supply unit configured to supply power to the air conditioning, a first slat, the landing gear, the doors, airbrakes, the brake accumulator, and the engine start-up, but only one at a time,
      a third electric power supply unit configured to supply power to the air conditioning, a second flap, the thrust reverser, a first spoiler, the brake accumulator, and the engine start-up, but only one at a time, and
      a fourth electric power supply unit configured to supply power to the air conditioning, the engine start-up, a second slat, the thrust reverser, the doors, the airbrakes, and the brake accumulators, but only one at a time, and
   the network of contactors is configured to cause the first, second, third, and fourth electric power supplies to supply power to subcombinations of the plurality of aircraft system units at different flight phases of the aircraft and to provide redundancy without a stand-by electric power supply unit, there being no unused electric power supply units during the flight phases of the aircraft, and no mutualization of two redundant systems.

2. The system according to claim 1, wherein said first electric power supply unit and said second electric power supply unit each include a 100 kW power supply.

3. The system according to claim 1, wherein said first electric power supply unit and said second electric power supply unit each include a first 50 kW power supply and a second 50 kW power supply.

4. The system according to claim 3, wherein said network of contactors causes the air conditioning to receive electrical power from the first 50 kW power supply in the first electric power supply unit and the first 50 kW power supply in the second electric power supply unit.

5. A power supply system for multiple aircraft systems of an aircraft, the power supply system comprising:
   a plurality of electric power supply units;
   a plurality of aircraft system units that include air conditioning, flaps, slats, thrust reversers, landing gear, engine start-up, doors, spoilers, and brakes; and
   a network of contactors configured to establish electrical connections between the plurality of aircraft system units and the plurality of electric power supply units,
   wherein the plurality of electric power supply units include,
      a first electric power supply unit configured to supply power to the engine start-up, the air conditioning, a first flap, and the thrust reverser, but only one at a time,
      a second electric power supply unit configured to supply power to a first spoiler, brake accumulators, and the air conditioning, but only one at a time,
      a third electric power supply unit configured to supply power to the air conditioning, a first slat, the landing gear, and the doors, but only one at a time,
      a fourth electric power supply unit configured to supply power to an air brake, the brake accumulators, the air conditioning, and the engine start-up, but only one at a time,
      a fifth electric power supply unit configured to supply power to the engine start-up, the air conditioning, a second flap, and the thrust reverser, but only one at a time,
      a sixth electric power supply unit configured to supply power to a second spoiler, the brake accumulators, and the air conditioning, but only one at a time,
      a seventh electric power supply unit configured to supply power to the air conditioning, a second slat, the thrust reverser, and the doors, but only one at a time, and
      an eighth electric power supply unit configured to supply power to the airbrakes, the brake accumulators, the air conditioning, and the engine start-up, but only one at a time and
   the network of contactors is configured to cause the first, second, third, fourth, fifth, sixth, seventh, and eighth electric power supplies to supply power to subcombinations of the plurality of aircraft system units at different flight phases of the aircraft and to provide redundancy without a stand-by electric power supply unit, there being no unused electric power supply units during the flight phases of the aircraft, and no mutualization of two redundant systems.

* * * * *